Patented Aug. 2, 1938

2,125,561

UNITED STATES PATENT OFFICE 2,125,561

ANTISYPHILITIC PREPARATION AND PROCESS OF MANUFACTURE

Paul J. Hanzlik, San Mateo, Calif., assignor to Board of Trustees of Leland Stanford Jr. University of California No Drawing. Application February 14, 1936, Serial No. 63,941

7 Claims. (Cl. 167—68)

This invention relates generally to therapeutic preparations for the treatment of syphilis, and to processes for their preparation. More particularly it relates to preparations containing bismuth in anionic form, as disclosed in my Patent No. 1,927,210.

It is an object of the invention to provide an inexpensive antisyphilitic preparation incorporating bismuth in anionic form, which can be taken orally as well as administered by intramuscular injection.

Another object of the invention is to provide a process for producing a satisfactory solution of a bismuth salt like sodium bismuthate, for use as an antisyphilitic preparation. The process avoids the use of strong alkalies, like sodium, potassium or ammonium hydroxide, and produces a solution having many desirable attributes, including the fact that the bismuth is not hydrolyzed to any material degree, and that the final solution is comparatively stable.

Briefly, the present process makes use of triisopropanolamine and propylene glycol, to dissolve a bismuth salt like sodium bismuthate. Under such conditions, with possible further dilution by water, the bismuth of the bismuthate remains in stable anionic form, and the solution is suitable for both intramuscular injection, and oral administration.

The use of triisopropanolamine and propylene glycol has been found superior to certain other reagents for dissolving sodium bismuthate. For example it has been found that strong alkalies such as sodium or potassium hydroxide, or ammonium hydroxide, are not suitable for dissolving the bismuthate, because they afford too much alkalinity and irritation for injection, and because preparations made by the use of such reagents are unstable. Weaker alkaline salts such as citrate, lactate or tartrate of sodium, dissolve sodium bismuthate with the aid of sodium hydroxide, but such preparations are likewise unsatisfactory and unstable, and stability is not materially increased by the use of propylene glycol. Monoethanolamine, and diethanolamine, are not suitable in place of triisopropanolamine, because they enable formation of only a partial solution, which is unstable. Triethanolamine is likewise unsuitable because although it readily produces a solution, with the aid of heat, the finished product is hydrolyzed and reduced while cooling, and is therefore unstable.

Propylene glycol, which I utilize in conjunction with triisopropanolamine, aids in stabilizing the solution produced. Glycerol or ethylene glycol, are not as satisfactory in place of propylene glycol, because the products produced when using such ingredients become darkened and turbid, and are not stable.

Specific directions for practicing the present invention, to produce a preparation suitable for both intramuscular injection and oral administration, are as follows:—Sodium bismuthate, such as is obtained on the market, is first purified by washing with water and by drying, so that it yields a bismuth content of about 70%. 3 grams of the purified sodium bismuthate, are added to 10 ccs. of propylene glycol and 8 grams of triisopropanolamine. The mixture is gradually heated by suitable means, such as a paraffine oil bath, with constant stirring. When the temperature reaches about 80° C., the mixture is removed from the bath with continued stirring, and further increase in temperature is controlled so as not to exceed 100° C. In about 10 minutes the sodium bismuthate is dissolved. The resulting viscous solution possesses a very dark or nearly black color.

After forming a solution as described above, it is diluted with about 40 ccs. of propylene glycol, and after cooling, enough water is added to make a total volume of 100 ccs. The resulting liquid product presents a reddish brown color. It contains about 50% propylene glycol, 8% triisopropanolamine, 3% sodium bismuthate, and the remainder water. This product is filtered, and the filtrate is the finished product ready for use by intramuscular injection or oral administration. It is kept in rubber-stoppered bottles, or in sealed ampoules, preferably in a dark place.

In making the product in dosage form for oral administration, the product is as follows: The process is followed substantially as described above, except that less propylene glycol and no water are used. A mixture containing 6 grams of purified sodium bismuthate, 16 grams triisopropanolamine and 3 ccs. of propylene glycol, are treated as previously described, until the reaction is completed and the solution is clear. In the proportions specified this may require about five minutes. As a matter of convenience, about 5 ccs. of 95% ethyl alcohol can then be added to the warm liquid material in order to render it more fluid and suitable for introduction into gelatine capsules. Each of the capsules can be made to contain about 1 gram of the product, or the equivalent of about 0.2 grams of sodium bismuthate. These capsules are preferably kept in a dark place in order to safeguard against decomposition of the bismuthate. The properties of the dosage form of my product are essentially the same as the product first described for both intramuscular injection and oral administration. However, for many individuals, the dosage form is more convenient.

Certain characteristics of the above product, can be outlined as follows: It can be boiled by itself, or with equal parts of blood or serum, without precipitation or decomposition. It is not precipitated by an 0.5% solution of sodium bicarbonate, 0.1% solution of hydrochloric acid, or 0.25% solution of acetic and glacial acetic acid, but it is precipitated by higher concentrations of these reagents, and by strong alkalies. It remains stable at room temperatures, and at refrigerating temperatures, and there is no ammoniacal decomposition on standing. Samples have been kept for over one and one-half years without change in appearance or composition, and with the bismuth remaining in anionic form or electronegative. It is alkaline in reaction, with a hydrogen ion concentration of about pH 11.2 (glass electrode). It possesses a peculiar sweetish taste, which is comparatively pleasant and non-irritative to the tongue, with a final slight astringent taste. It has comparative freedom from tissue irritation, which correlates with the fact that the product does not precipitate blood and serum either at room temperatures or on boiling. When injected intramuscularly in dosages of about 1 cc., it is well tolerated by both animals and human subjects, without symptoms of undue irritation. When administered gastrically or by mouth or intestine to animals, gastro-intestinal absorption is definite and results in systemic action of bismuth. Also definite therapeutic effects occur in experimental syphilis of rabbits.

Very large doses cause toxic and fatal effects. Anti-syphilitic action in clinical syphilis, with amelioration of symptoms and signs of the disease, and a change from positive to negative serology (Wasserman and Kahn tests) are definite in certain observed cases. About 8 ccs. of the solution by mouth (as prepared for both intramuscular and oral administration) is the equivalent of 1 cc. by intramuscular injection, for antisyphilitic action and as indicated by the bismuth content of the blood.

I have previously referred to the formation of a solution of sodium bismuthate in triisopropanolamine and propylene glycol, because the preparation serves the purpose of a true solution. Considerable evidence points to the fact that a chemical reaction takes place between the sodium bismuthate and triisopropanolamine. As mentioned in describing the process, considerable heat is evolved after the mixture of sodium bismuthate, triisopropanolamine and propylene glycol, is heated to about 80° C. This evolution of heat may be heat of solution, but it seems more likely that a complex exothermic reaction takes place. An ether extract of the bismuth complex from the product forms feather-shaped clusters of needle-like crystals, which microscopically appear light buff or tan in color. The same crystals can be obtained from the reaction product of sodium hydroxide (in excess), bismuth hydroxide, and triisopropanolamine, but have not been obtained from sodium bismuthate of itself. Therefore, it is evident that the propylene glycol does not enter into any chemical reaction, but serves as a stabilizer and liquid vehicle.

In general the possibility of oral administration of the product provides a convenient means of antisyphilitic medication without the necessity of injection by a physician, thus enabling convenient self-medication of patients under physician's directions, and convenient large scale prophylaxis of syphilis. Oral administration may be used to support intramuscular injection of sodium bismuthate soluble, or other antisyphilitic medication. It offers a comparatively cheap form of medication with bismuth, particularly since no elaborate or difficult processes or preparation are required.

With respect to possible variations or modifications, it will be evident to those skilled in chemistry that in place of using a pure form of sodium bismuthate, ingredients can be used which when reacted together will produce sodium bismuthate or equivalent compounds. In this connection reference can be made to bismuth compounds like bismuth trichloride or bismuth hydroxide, reacted with an excess of an alkaline salt or an alkali like sodium hydroxide, with the reaction product incorporated with triisopropanolamine and propylene glycol. However, in the event such reagents are used in place of a pure form of sodium bismuthate, consideration should be given to the production of objectionable or unnecessary by-products of the reaction. Likewise other bismuth salts, including various iodobismuthites, can be readily dissolved by the use of triisopropanolamine and propylene glycol, but before such modified products are employed, due consideration should be given to possible stability and physiological effects, as compared to the use of sodium bismuthate.

I claim:

1. In an antisyphilitic preparation, the bismuth product resulting from the exothermic incorporation of sodium bismuthate with triisopropanolamine, capable of forming feather-shaped clusters of needle-like crystals.

2. In an antisyphilitic preparation, the product resulting from the exothermic incorporation of sodium bismuthate with triisopropanolamine and a non-toxic glycol, said product being stable in that it is not precipitated or decomposed by boiling with blood or serum.

3. In an antisyphilitic preparation, the product resulting from the incorporation of sodium bismuthate with triisopropanolamine and a non-toxic glycol, said product being stable in that it is not precipitated by 0.5% solution of sodium bicarbonate, an 0.1% solution of hydrochloric acid, or an 0.25% solution of acetic and glacial acetic acid, and also being stable in that it is not precipitated or decomposed by boiling with blood or serum.

4. In an antisyphilitic preparation for intramuscular injection and oral administration, the product resulting from the exothermic incorporation of sodium bismuthate with triisopropanolamine, together with propylene glycol and water, the proportions of the ingredients employed corresponding substantially to three grams of sodium bismuthate, eight grams of triisopropanolamine, 50 cc. of propylene glycol, and water sufficient to form about 100 cc. of the preparation.

5. In an antisyphilitic preparation for oral administration, the product resulting from the exothermic incorporation of sodium bismuthate with triisopropanolamine, together with propylene glycol, in proportions corresponding substantially to six grams of sodium bismuthate, sixteen grams of triisopropanolamine employed, and 3 cc. of propylene glycol.

6. In a process for forming an antisyphilitic preparation, heating a mixture consisting of sodium bismuthate, triisopropanolamine and propylene glycol, until the commencement of an exothermic reaction, and then permitting the exothermic reaction to proceed to substantial completion while simultaneously removing heat at a rate sufficient to avoid decomposition by excessive heating.

7. In a process for preparing an antisyphilitic preparation, heating a mixture of sodium bismuthate, triisopropanolamine, and propylene glycol to a temperature of about 80° C., whereby an exothermic reaction occurs, and thereafter permitting the exothermic reaction to proceed to substantial completion while controlling the temperature so that it does not exceed about 100° C.

PAUL J. HANZLIK.